United States Patent
Kusuda (10) Patent No.: US 6,814,452 B2
(45) Date of Patent: Nov. 9, 2004

(54) TOUCH-PANEL WITH LIGHT SHIELDING PERIPHERAL PART

(75) Inventor: Yasuji Kusuda, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 150 days.

(21) Appl. No.: 10/239,752

(22) PCT Filed: Mar. 28, 2001

(86) PCT No.: PCT/JP01/02532
§ 371 (c)(1),
(2), (4) Date: Sep. 26, 2002

(87) PCT Pub. No.: WO01/75576
PCT Pub. Date: Oct. 11, 2001

(65) Prior Publication Data
US 2003/0090803 A1 May 15, 2003

(30) Foreign Application Priority Data
Mar. 31, 2000 (JP) .......................................... 2000-99561

(51) Int. Cl.[7] .............................................. G02B 27/00
(52) U.S. Cl. ...................................... 359/613; 359/609
(58) Field of Search ................................ 359/613, 609; 349/152, 158, 44, 110, 191

(56) References Cited

U.S. PATENT DOCUMENTS 6,211,935 B1 * 4/2001 Yamada ...................... 349/149

FOREIGN PATENT DOCUMENTS

| JP | 60-000529 | 1/1985 |
| JP | 4-100140 | 4/1992 |
| JP | 8-241160 | 9/1996 |
| JP | 9-244814 | 9/1997 |
| JP | 11-073137 | 3/1999 |
| JP | 11-202282 | 7/1999 |
| JP | 2000-147485 | 5/2000 |
| JP | 3117010 | 10/2000 |

* cited by examiner

Primary Examiner—Mohammad Sikder
(74) Attorney, Agent, or Firm—Wenderoth, Lind & Ponack, L.L.P.

(57) ABSTRACT

Provided is a touch panel, which has a light-shielding effect in its peripheral portion and is able to improve the visibility of its screen at low cost and also cope with the thickness reduction of a product provided with an LCD with a touch panel. In an analog resistive film system touch panel, where conductive panels (1, 2) are arranged opposite to each other with transparent electrodes (12, 22) formed by a whole or a part of a transparent conductive film and wiring lines formed on one-side surfaces of transparent insulative substrates (11, 21) and one or more resin layers (4, 28, 15) are provided for various purposes in the peripheral portion located between the transparent insulative substrates, at least one layer of the resin layers additionally has a light-shielding function by being colored black.

7 Claims, 5 Drawing Sheets

TOUCH-PANEL WITH LIGHT SHIELDING PERIPHERAL PART

TECHNICAL FIELD

The present invention relates to a touch panel, which has a light-shielding effect in its peripheral portion and is able to improve the visibility of its screen at low cost and also cope with a reduction in thickness of a product provided with an LCD with a touch panel.

BACKGROUND ART

Conventionally, an analog resistive film system touch panel, where conductive panels 201 and 202 are arranged opposite to each other with transparent electrodes 212 and 222 formed with the whole or a part of transparent conductive films and wiring lines formed on one-side surfaces of transparent insulative substrates 211 and 221, is arranged on the screen of a liquid crystal display (LCD) of a word processor, a personal computer, or the like. By effecting downward pressurization with a finger, a pen, or the like according to instructions seen through the screen, positional inputting is effected.

Figure 4:
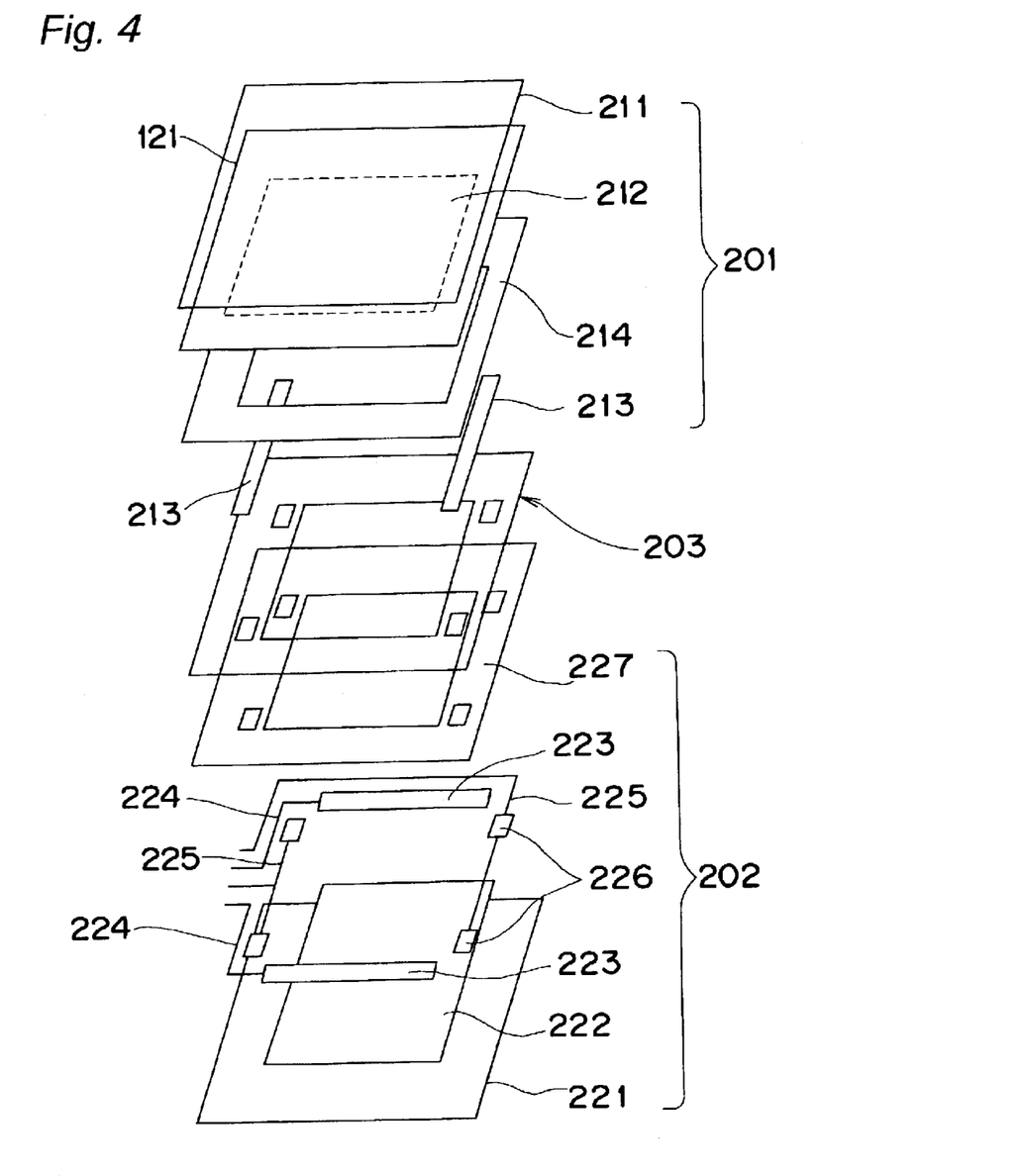
FIG. 4 is an exploded view showing a touch panel according to a prior art.

The above-mentioned analog resistive film system touch panel normally includes one or more resin layers for various purposes in its peripheral portion located between the transparent insulative substrates 211 and 221. One example of the above-mentioned resin layer, as shown in FIG. 4, has an adhesion layer 203 formed for the purpose of bonding the conductive panels to each other between the conductive panel 201 located on the touch input side and the conductive panel 202 located on the screen side. There are further included a wiring line overcoat layer 227, which is formed for the purpose of mutually insulating the wiring lines arranged parallel in the peripheral portions of a surface that has wiring lines of lead electrodes 223, routing circuits 224 and 225, connection electrodes 226, and the like of a conductive panel with interposition of a wiring oxidation inhibitor or a minute gap, an insulative is patterning layer 214 formed for the purpose of obtaining the transparent electrode 212 by insulating the peripheral portion of a surface that has on its entire surface the transparent conductive film 121 of the transparent insulative substrate 211, and so on.

Figure 5:
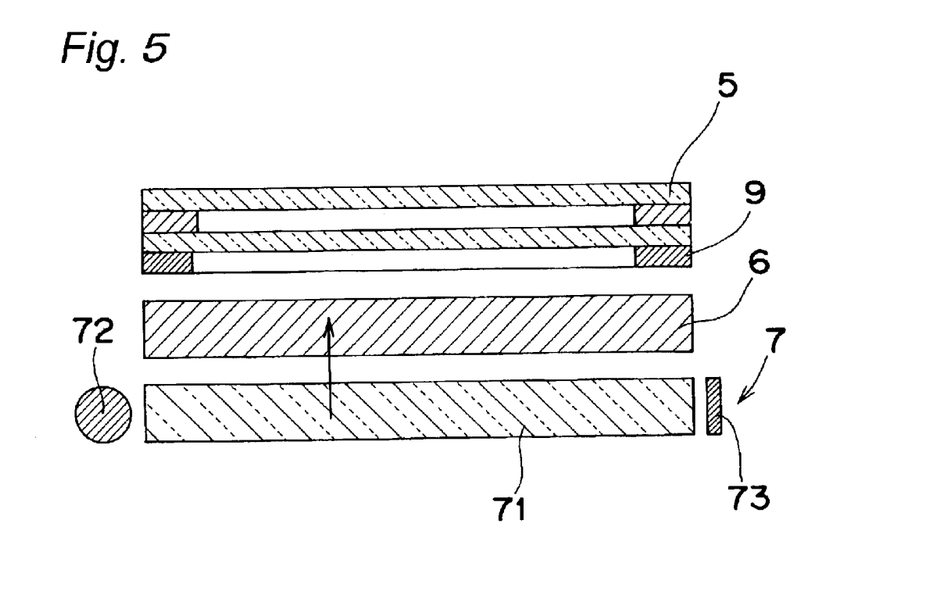
FIG. 5 is a schematic view for explaining the light-shielding operation of the analog resistive film system touch panel of the prior art.
Figure 6:
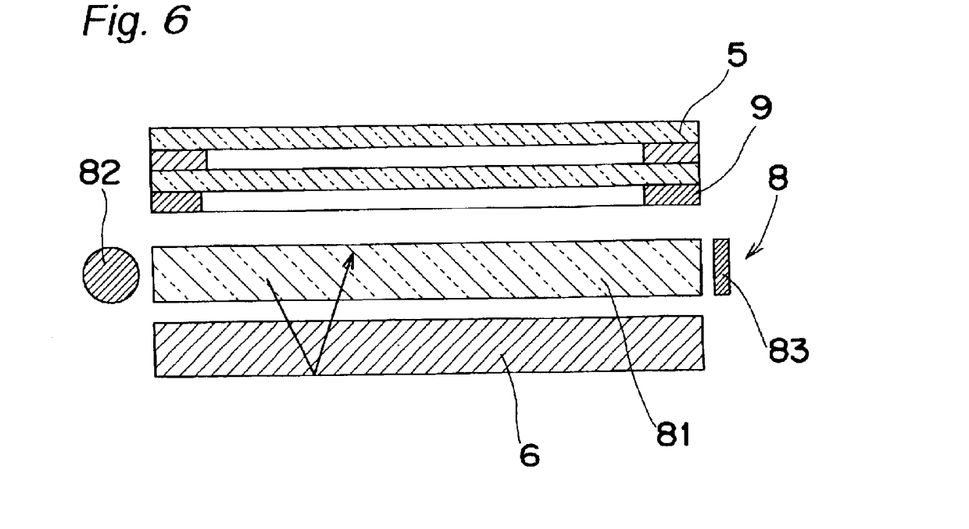
FIG. 6 is a schematic view for explaining the light-shielding operation of the analog resistive film system touch panel of the prior art.

Moreover, as an illuminator used for the LCD 6, a back light 7 is arranged on the back surface when the LCD 6 is a transmission type (see FIG. 5) or a front light 8 is arranged between the touch panels 5 and the LCD 6 when the LCD 6 is a reflection type liquid crystal (see FIG. 6). Either light is provided with a line light source 72 or 82 such as a cold cathode tube arranged on an end surface of its light guide plate 71 or 81 made of a transparent resin or the like. A beam of light taken in from the end surface of the light guide plate 71 or 81 is guided depthwise while being totally reflected inside the light guide plate 71 or 81, and a part of the light is emitted from one surface of the light guide plate 71 or 81 to illuminate the LCD 6.

In recent years, according to the dimensional reduction of products provided with an LCD with a touch panel of a word processor, a personal computer, or the like and the dimensional increase of their screens, the outside dimensions of the light guide plates 71 and 81 of the back light 7 and the front light 8 have come close to the screen dimensions of the products. As a result, a luminescent line has occurred in a portion located inside the screen near the edge on the line light source 72 or 82 side due to intense light, which has been incident from the line light source 72 or 82 to enter the light guide plate 71 or 81 and emitted as it is from the neighborhood of the line light source, and this has reduced visibility. Moreover, even with a side surface reflecting layer 73 or 83 provided on the side surface on which the line light source 72 or 82 of the light guide plate 71 or 81 has been absent, a luminescent line has similarly occurred in a portion located inside the screen near the edge on the side surface reflecting layer 73 or 83 side due to scatter reflections on the side surface reflecting layer.

Accordingly, there is presently taken a means for restraining the occurrence of the luminescent line by sticking a frame-shaped black light-shielding sheet 9 to the touch panel 5 (see FIG. 5 and FIG. 6), the back light 7, the front light 8, the LCD 6, or the like.

However, measures against the luminescent line needs the operation of preparing and sticking a black light-shielding sheet only for the measures against the luminescent line aside from the construction of the touch panel, the LCD, and so on, and this leads to a problem that the production cost costs high. Furthermore, the black light-shielding sheet is cut in a frame-like shape with its inside portion scrapped, and this leads to wastefulness.

Moreover, the total thickness of the product provided with an LCD with a touch panel, such as a word processor or a personal computer, has increased by the thickness of the black light-shielding sheet, and this has led to an issue that the arrangement has not been able to cope with the thickness reduction of the product.

Accordingly, an object of the present invention is to solve the aforementioned issues and provide a touch panel, which has a light-shielding effect in the peripheral portion and is able to improve the visibility of its screen at low cost and also cope with a reduction in thickness of a product provided with an LCD with a touch panel.

DISCLOSURE OF INVENTION

In order to achieve the aforementioned object, the present invention is constructed as follows.

In order to achieve the aforementioned object, according to a first aspect of the present invention, there is provided an analog resistive film system touch panel comprising:

conductive panels arranged opposite to each other with transparent electrodes having a light-shielding effect in its peripheral portion being formed by a whole or a part of transparent conductive films and wiring lines formed on one-side surfaces of transparent insulative substrates; and a resin layer comprised of one or more layers located peripherally between the transparent insulative substrates of the conductive panels arranged opposite to each other, wherein at least one layer of the resin layers serves as a light-shielding layer for shielding light while being colored black.

According to a second aspect of the present invention, there is provided the touch panel having a light-shielding effect in its peripheral portion as defined in the first aspect, wherein the light-shielding layer is an adhesion layer, which is arranged between the conductive panels and colored black so as to shield light.

According to a third aspect of the present invention, there is provided the touch panel having a light-shielding effect in its peripheral portion as defined in the first or second aspect, wherein the light-shielding layer is at least one layer of wiring line overcoat layers, said at least one layer being arranged on the wiring line located in a peripheral portion of the conductive panel and colored black so as to shield light.

According to a fourth aspect of the present invention, there is provided the touch panel having a light-shielding effect in its peripheral portion as defined in the first or second aspect, wherein the light-shielding layer is at least one layer of insulative patterning layers, said at least one layer being arranged on the transparent conductive film located in a peripheral portion of the conductive panel and colored black so as to shield light.

According to a fifth aspect of the present invention, there is provided the touch panel having a light-shielding effect in its peripheral portion as defined in the third aspect, wherein the light-shielding layer is at least one layer of insulative patterning layers, said at least one layer being arranged on the transparent conductive film located in a peripheral portion of the conductive panel and colored black so as to shield light.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Before the description of the present invention proceeds, it is to be noted that like parts are designated by like reference numerals throughout the accompanying drawings.

Touch panels having light-shielding effects in their peripheral portions according to various embodiments of the present invention will be described in detail below with reference to the drawings.

Figure 1:
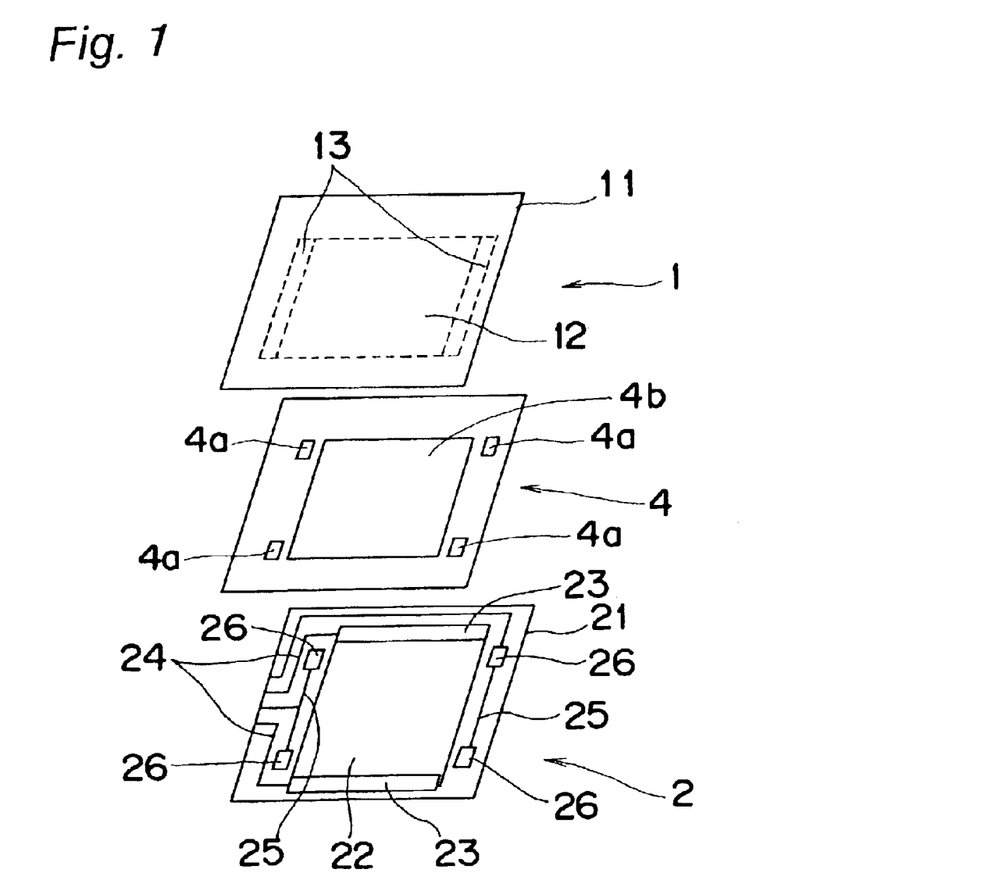
FIG. 1 is an exploded view showing a touch panel, which has a light-shielding effect in its peripheral portion, according to a first embodiment of the present invention.
Figure 2:
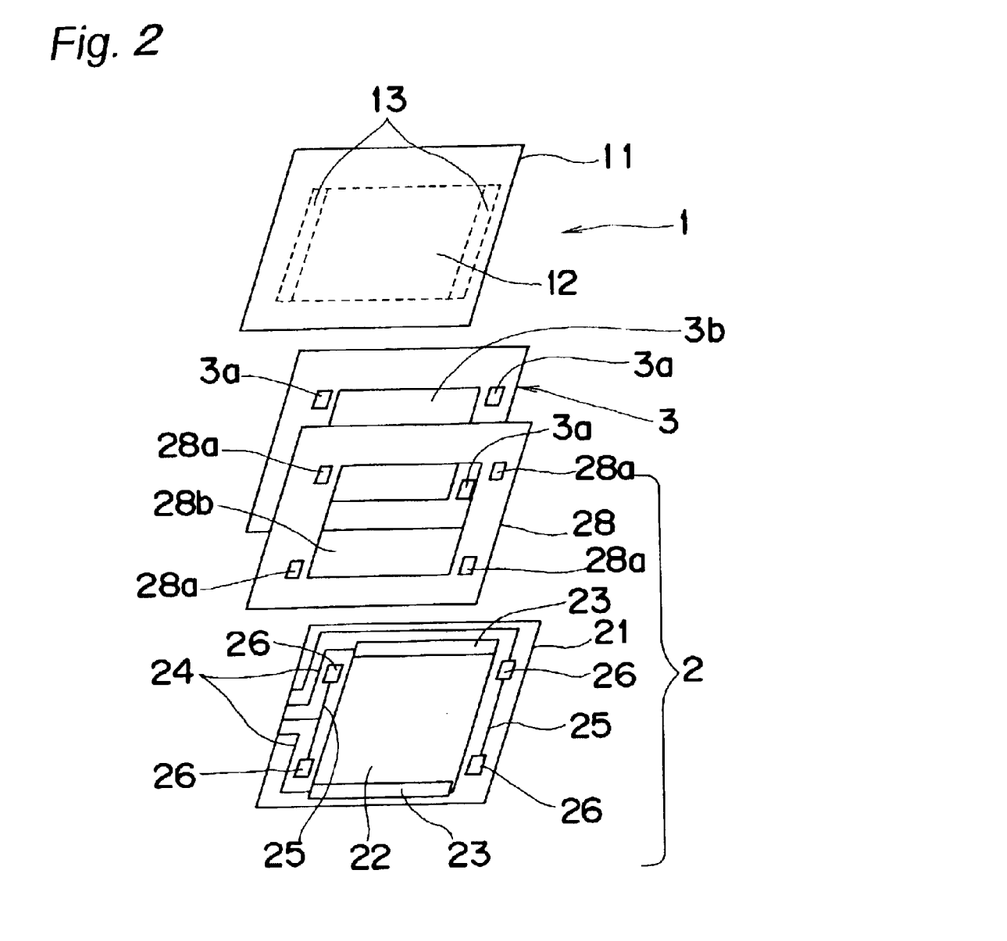
FIG. 2 is an exploded view showing a touch panel, which has a light-shielding effect in its peripheral portion, according to a second embodiment of the present invention.
Figure 3:
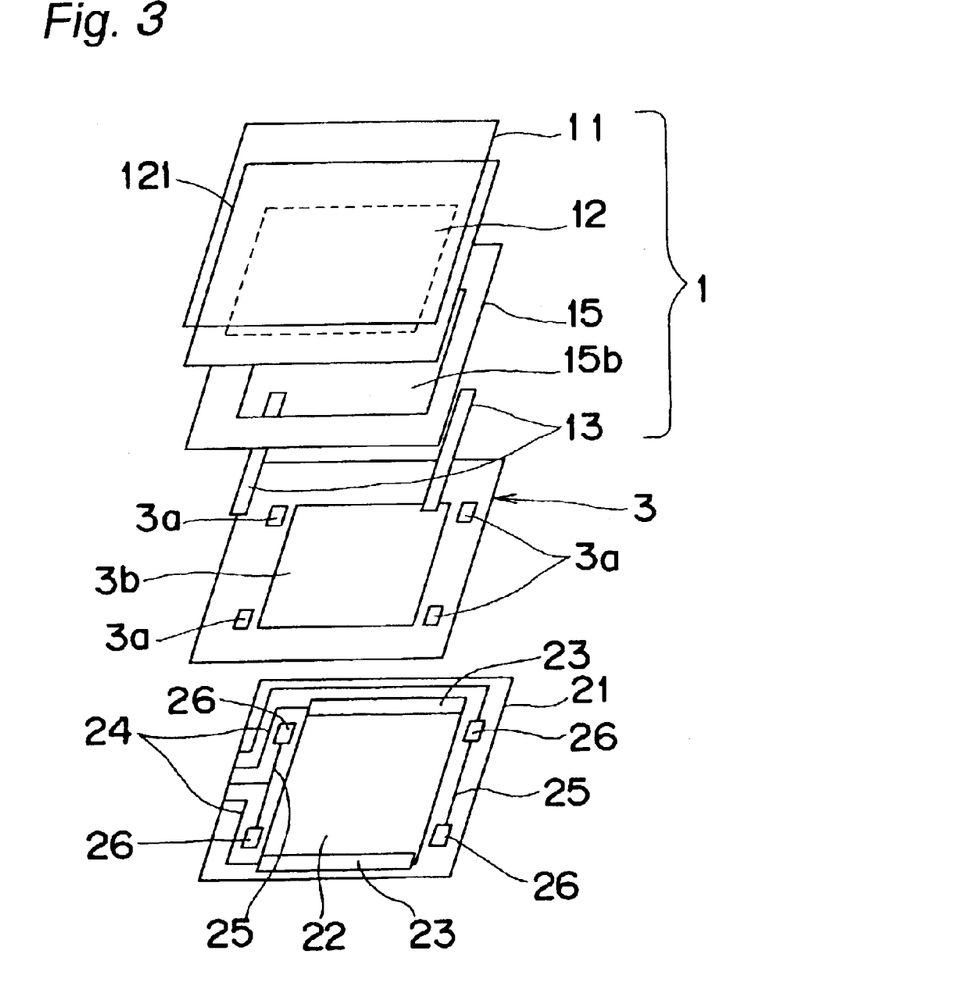
FIG. 3 is an exploded view showing a touch panel, which has a light-shielding effect in its peripheral portion, according to a third embodiment of the present invention.

FIGS. 1 through 3 are exploded views showing the touch panels having light-shielding effects in their peripheral portions according to the first through third embodiments, respectively, of the present invention. In the figures, reference numeral 1 denotes a conductive panel, 11 denotes a quadrangular sheet-shaped transparent insulative substrate, 12 a quadrangular transparent electrode, 121 a transparent conductive film, 13 lead electrodes, 15 a quadrangular frame-shaped insulative patterning layer with a light-shielding function, 2 a quadrangular conductive panel, 21 a sheet-shaped transparent insulative substrate, 22 a transparent electrode, 23 lead electrodes, 24 and 25 routing circuits, 26 connection electrodes, 28 a quadrangular frame-shaped wiring line overcoat layer with a light-shielding function, 3 a quadrangular frame-shaped adhesion layer, and 4 a quadrangular frame-shaped adhesion layer with a light-shielding function.

The adhesion layer 4 with a light-shielding function functions as one example of the light-shielding layer and includes a quadrangular through hole 4b through which the transparent electrodes 12 and 22 can be brought in contact with each other; and through holes 4a, which are arranged in the neighborhood of the through hole 4b and bring four connection electrodes 26 of the transparent insulative substrate 21 in contact with the lead electrodes 13 of the conductive panel 1 located on the touch input side.

The wiring line overcoat layer 28 functions as one example of the light-shielding layer and includes a quadrangular through hole 28b through which the transparent electrodes 12 and 22 can be brought in contact with each other; and through holes 28a, which are arranged in the neighborhood of the through hole 28b and bring the four connection electrodes 26 of the transparent insulative substrate 21 in contact with the lead electrodes 13 of the conductive panel 1 located on the touch input side.

The adhesion layer 3 has a quadrangular through hole 3b through which the transparent electrodes 12 and 22 can be brought in contact with each other; and through holes 3a, which are arranged in the neighborhood of the through hole 3b and bring the four connection electrodes 26 of the transparent insulative substrate 21 in contact with the lead electrodes 13 of the conductive panel 1 located on the touch input side.

Further, the insulative patterning layer 15 functions as one example of the light-shielding layer and includes a quadrangular through hole 15b through which the transparent electrodes 12 and 22 can be brought in contact with each other.

The first embodiment of the present invention to which the light-shielding function is added by coloring black the adhesion layer 4 formed between the conductive panels 1 and 2 will be described first as one example of the light-shielding layer (see FIG. 1).

The conductive panel 1 located on the touch input side of the touch panel shown in FIG. 1 has the transparent electrode 12 in the center portion of one surface of the transparent insulative substrate 11, and the lead electrodes 13 on the opposing sides thereof.

On the other hand, the conductive panel 2 located on the screen side of the touch panel shown in FIG. 1 has the transparent electrode 22 in the center portion of one surface of the transparent insulative substrate 21, and the lead electrodes 23 on the opposing sides thereof. The panel collectively has two pairs of routing circuits 24 and 25 in the insulating portions outside the transparent electrode 22, and further has, for example, the four connection electrodes 26 in the insulating portions outside the transparent electrode 22. The routing circuits 24 and 25 and the connection electrodes 26 are formed independently of the transparent electrode 22 and the lead electrodes 23. Among the routing circuits, one pair of routing circuits 24 is connected to the lead electrodes 23 of the same panel, and the other pair of routing circuits 25 is connected to the lead electrodes 13 of the conductive panel 1 located on the touch input side via the connection electrodes 26.

The conductive panel 1 located on the touch input side and the conductive panel 2 located on the screen side are arranged opposite to each other with the transparent electrodes 12 and 22 located inside so that the lead electrodes 13 and 23 are arranged in a rectangular form with the panels located on the touch input side and on the screen side, between which the adhesion layer 4 with a light-shielding function is arranged.

The transparent insulative substrate 11 of the conductive panel 1 located on the touch input side is required to have flexibility for an input purpose, and in general, there is used an engineering plastic of a polycarbonate family, a polyamide family, a polyether ketone family, or the like; a transparent film of an acrylic family, a polyethylene terephthalate family, a polybutylene terephthalate family, or the like; or a laminate of those materials. A hard coat layer may be formed on a surface opposite from a surface, which belongs to the transparent insulative substrate 11 of the conductive panel 1 located on the touch input side and on which the transparent electrode 12 is provided. For the hard coat layer, there exist an inorganic material such as a resin of a siloxane family; and an organic material such as a thermosetting type resin of an acrylic epoxy family or an urethane family, a photo-curing type resin of an acrylate family and the like. The transparent insulative substrate 11 of the conductive panel 1 located on the touch input side may have its surface that is opposite from the surface on which the transparent electrode 12 is provided, subjected to a non-glare process for preventing the reflection of light. The non-glare process is performed by, for example, providing undulations on the transparent insulative substrate 11 and the hard coat layer or mixing an extender pigment; or fine particles of silica, alumina; or the like into the hard coat layer.

As the transparent insulative substrate 21 of the conductive panel 2 located on the screen side, there are used a glass plate of soda glass, borosilicate glass, tempered glass, or the like; an engineering plastic of a polycarbonate family, a polyamide family, a polyether ketone family, or the like; a transparent resin plate or a transparent film of an acrylic family, a polyethylene terephthalate family, a polybutylene terephthalate family, or the like; or a laminate of the materials.

The transparent electrodes 12 and 22 can be obtained as transparent conductive films formed only in the center portions of the transparent insulative substrates 11 and 21 of the conductive panels located on the touch input side and on the screen side, respectively. As a means for patterning this transparent conductive film, there can be enumerated a method for providing a transparent conductive film on the entire surface and thereafter removing the unnecessary transparent conductive film through a resist etching process, and a method for patterning the transparent conductive film via a metal mask, or the like. Moreover, one or both of the transparent electrodes 12 and 22 can also be obtained, by covering the peripheral portion of the transparent conductive film formed on the entire surface of the transparent insulative substrate with an insulative patterning layer, as an exposed portion of the transparent conductive film. As a material of the transparent conductive film described above, there is a metal oxide film of tin oxide, indium oxide, antimony oxide, zinc oxide, cadmium oxide, indium tin oxide (ITO), or the like; a composite film mainly constructed of these metal oxide substances; or a metal film of gold, silver, copper, tin, nickel, aluminum, palladium, or the like. Moreover, the transparent conductive film may have a multi-layer form. As a method for forming the transparent conductive film, there is, for example, a vacuum evaporation method, a sputtering method, an ion plating method, or a CVD method.

For the lead electrodes 13 and 23, the routing circuits 24 and 25, and the connection electrodes 26, there is used a paste having an electric conductivity, such as a metal of gold, silver, copper, nickel, or the like; or carbon. As a method for forming these members, there is the printing method of screen printing, offset printing, gravure printing, flexographic printing, or the like; a photoresist method; a brush coating method; or the like.

For the adhesion layer 4 with a light-shielding function, there is used a double-sided tape, which is colored with an insulative black pigment or the like, or, for example, iron tetraoxide, and of which the portion corresponding to the visible area of the panel and the portion corresponding to the connection electrodes 26 are punched away. It is also acceptable to color an adhesive of, for example, a printing paste of an aqueous or acrylic family or the like with an insulative black pigment or the like in place of the double-sided tape. Moreover, it is also acceptable to make this adhesion layer 4 with a light-shielding function concurrently operate as the insulative patterning layer for patterning the transparent conductive film.

It is to be noted that the first embodiment is not limited to the one shown in FIG. 1. For example, the touch panel shown in FIG. 1 collectively has two pairs of routing circuits on the conductive panel 2 located on the screen side. However, it is acceptable to arrange the panel, on which the routing circuits are collectively formed, on the conductive panel 1 located on the touch input side instead of the conductive panel 2 located on the screen side, or to form one pair of routing circuits on each of the conductive panel 2 located on the screen side and the conductive panel 1 located on the touch input side.

The touch panel, to which the light-shielding function is added by coloring black the adhesion layer 4 formed between the conductive panels 1 and 2 as described above, does not need the operation of preparing and sticking the black light-shielding sheet for the measures against the luminescent line aside from the construction of the touch panel dissimilarly to the prior art. Therefore, the visibility of the screen can be improved at low cost. Moreover, since the total thickness of the product provided with an LCD with a touch panel, such as a word processor and a personal computer, is reduced due to the needlessness of a black light-shielding sheet, this arrangement can cope with a thickness reduction.

The second embodiment of the present invention to which a light-shielding function is added by coloring black at least one layer 28 out of the wiring line overcoat layers formed on the wiring located in the peripheral portion of the conductive panel will be described next as one example of the light-shielding layer (see FIG. 2).

The conductive panel 1 located on the touch input side of the touch panel shown in FIG. 2 has a transparent electrode 12 in the center portion of one surface of the transparent insulative substrate 11, and the lead electrodes 13 on the opposing sides thereof.

On the other hand, the conductive panel 2 located on the screen side of the touch panel shown in FIG. 2 has the transparent electrode 22 in the center portion of one surface of the transparent insulative substrate 21, and the lead electrodes 23 on the opposing sides thereof. The panel collectively has two pairs of routing circuits 24 and 25 in the insulating portions outside the transparent electrode 22 and further has the connection electrodes 26 in the insulating portions outside the transparent electrode 22. The routing circuits 24 and 25 and the connection electrodes 26 are formed independently of the transparent electrode 22 and the lead electrodes 23. Among the routing circuits, one pair of routing circuits 24 is connected to the lead electrodes 23 of the same panel, and the other pair of routing circuits 25 is connected to the lead electrodes 13 of the conductive panel 1 located on the touch input side via the connection electrodes 26. Moreover, the wiring line overcoat layer 28 with a light-shielding function is formed in the peripheral portion of the surface that has the wiring lines of the routing circuits 24 and 25 and the like, covering the routing circuits 24 and 25 and the lead electrodes 23.

Moreover, the conductive panel 1 located on the touch input side and the conductive panel 2 located on the screen side are arranged opposite to each other with the transparent electrodes 12 and 22 located inside so that the lead electrodes 13 and 23 are arranged in a rectangular form with the panels located on the touch input side and on the screen side, between which the adhesion layer 3 is arranged.

The wiring overcoat layer 28 with a light-shielding function is intended to prevent the oxidation of the wiring lines of the routing circuits and the like and to mutually insulate the wiring lines, which are arranged mutually parallel at minute intervals and provided by coloring an insulative resin, film, or the like, such as solder resist, with an insulative black pigment or the like, or, for example, iron tetraoxide. As a method for forming the wiring line overcoat layer 28 with a light-shielding function, there is the printing method of screen printing, offset printing, gravure printing, flexographic printing, or the like; a brush coating method; film lamination; or the like.

For the adhesion layer 3, there is used a double-sided tape, of which the portion corresponding to the visible area of the panel and the portion corresponding to the connection electrodes 26 are punched away. It is also acceptable to use an adhesive of, for example, a printing paste of an aqueous or acrylic family or the like in place of the double-sided tape. Moreover, it is also acceptable to make this adhesion layer 3 concurrently operate as the insulative patterning layer for patterning the transparent conductive film.

The transparent insulative substrates 11 and 21, the transparent electrodes 12 and 22, the lead electrodes 13 and 23, the routing circuits 24 and 25, and the connection electrodes 26, which are shown in FIG. 2, are similar to those of the first embodiment.

The second embodiment is not limited to the one shown in FIG. 2, and it is acceptable to form, for example, a wiring line overcoat layer with a light-shielding function not on the conductive panel 2 located on the screen side but on the conductive panel 1 located on the touch input side. It is also acceptable to form a wiring line overcoat layer with a light-shielding function on each of the conductive panel 2 located on the screen side and the conductive panel 1 located on the touch input side. The touch panel shown in FIG. 2 collectively has two pairs of routing circuits on the conductive panel 2 located on the screen side. However, it is acceptable to arrange the panel, on which the routing circuits are collectively formed, not on the conductive panel 2 located on the screen side but on the conductive panel 1 located on the touch input side. It is also acceptable to form one pair of routing circuits on each of the conductive panel 2 located on the screen side and the conductive panel 1 located on the touch input side.

Moreover, an adhesion layer with a light-shielding function may be formed in place of the adhesion layer also in the second embodiment.

The touch panel, to which the light-shielding function is added by coloring black at least one layer 28 out of the wiring line overcoat layers formed on the wiring lines in the peripheral portions of the conductive panel as described above, does not need the operation of preparing and sticking the black light-shielding sheet for the measures against the luminescent line aside from the construction of the touch panel dissimilarly to the prior art. Therefore, the visibility of the screen can be improved at low cost. Moreover, since the total thickness of the product provided with an LCD with a touch panel, such as a word processor and a personal computer, is reduced due to the needlessness of a black light-shielding sheet, this arrangement can cope with a thickness reduction.

The third embodiment of the present invention to which a light-shielding function is added by coloring black at least one layer 15 out of the insulative patterning layers formed on the transparent conductive film in the peripheral portion of a conductive panel will be described next as one example of the light-shielding layer (see FIG. 3).

The conductive panel 1 located on the touch input side of the touch panel shown in FIG. 3 is constructed in a manner that the peripheral portion of a transparent conductive film 121 formed entirely on one surface of the transparent insulative substrate 11 is covered with an insulative patterning layer 15 with a light-shielding function, the exposed portion of the transparent conductive film 121 is provided as a transparent electrode 12, and lead electrodes 13 are provided on the opposing sides of the transparent electrode 12.

On the other hand, the conductive panel 2 located on the screen side of the touch panel shown in FIG. 3 has the transparent electrode 22 in the center portion of one surface of the transparent insulative substrate 21, and the lead electrodes 23 on the opposing sides thereof. The panel collectively has two pairs of routing circuits 24 and 25 in the insulating portions outside the transparent electrode 22 and further has the connection electrodes 26 in the insulating portions outside the transparent electrode 22. The routing circuits 24 and 25 and the connection electrodes 26 are formed independently of the transparent electrode 22 and the lead electrodes 23. Among the routing circuits, one pair of routing circuits 24 is connected to the lead electrodes 23 of the same panel, and the other pair of routing circuits 25 is connected to the lead electrodes 13 of the conductive panel 1 located on the touch input side via the connection electrodes 26.

Moreover, the conductive panel 1 located on the touch input side and the conductive panel 2 located on the screen side are arranged opposite to each other with the transparent electrodes 12 and 22 located inside so that the lead electrodes 13 and 23 are arranged in a rectangular form with the panels located on the touch input side and on the screen side, between which the adhesion layer 3 is arranged.

The insulative patterning layer 15 with a light-shielding function is intended to obtain a transparent electrode by insulating the peripheral portion of a surface, which belongs to the transparent insulative substrate and has the transparent conductive film on the entire surface thereof and is provided by coloring an insulative resin, film, or the like, such as solder resist, with an insulative black pigment or the like, or, for example, iron tetraoxide. As a method for forming the insulative patterning layer 15 with a light-shielding function, there is the printing method of screen printing, offset printing, gravure printing, flexographic printing, or the like; a brush coating method; film lamination; or the like.

The transparent insulative substrates 11 and 21, the transparent electrode 22, the lead electrodes 13 and 23, the routing circuits 24 and 25, the connection electrodes 26, and the adhesion layer 3, which are shown in FIG. 3, are similar to those of the first embodiment and the second embodiment.

Moreover, the transparent electrode 12 shown in FIG. 3 is similar to those of the first embodiment and the second embodiment except that the electrode is limited to the one obtained, by covering the peripheral portion of the transparent conductive film formed on the entire surface of the transparent insulative substrate with the insulative patterning layer 15 with a light-shielding function, as the exposed portion of the transparent conductive film.

The third embodiment is not limited to the one shown in FIG. 3, and it is acceptable to form, for example, the insulative patterning layer 15 with a light-shielding function not on the conductive panel 1 located on the touch input side but on the conductive panel 2 located on the screen side. In other words, it is also acceptable to totally form the transparent conductive film of the conductive panel 2 located on the screen side and insulate its peripheral portion with an insulative patterning layer with a light-shielding function, for the provision of the transparent electrode 22. Moreover, it is acceptable to form an insulative patterning layer with a light-shielding function on each of the conductive panel 2 located on the screen side and the conductive panel 1 located on the touch input side. The touch panel shown in FIG. 3 is constructed so as to collectively have two pairs of routing circuits on the conductive panel 2 located on the screen side. However, it is acceptable to arrange the panel, on which the routing circuits are collectively formed, not on the conductive panel 2 located on the screen side but on the conductive panel 1 located on the touch input side. It is also acceptable to form one pair of routing circuits on each of the conductive panel 2 located on the screen side and the conductive panel 1 located on the touch input side.

Moreover, even in the third embodiment, it is acceptable to form an adhesion layer with a light-shielding function in place of the adhesion layer or to form a wiring line overcoat layer with a light-shielding function in place of the wiring line overcoat layer.

The touch panel, to which the light-shielding function is added by coloring black at least one layer 15 out of the insulative patterning layers formed on the transparent conductive film located in the peripheral portion of the conductive panel as described above, does not need the operation of preparing and sticking a black light-shielding sheet for the measures against the luminescent line aside from the construction of the touch panel dissimilarly to the prior art. Therefore, the visibility of the screen can be improved at low cost. Moreover, since the total thickness of the product provided with an LCD with a touch panel, such as a word processor and a personal computer, is reduced due to the needlessness of a black light-shielding sheet, this arrangement can cope with a thickness reduction.

Moreover, the touch panel of the present invention, which has the light-shielding effect in its peripheral portion, is not limited to the constructions of the first through third embodiments. It is acceptable to add a light-shielding function by coloring black the layer(s) other than the adhesion layer, the wiring line overcoat layer, and the insulative patterning layer in the case of a resin layer formed for various purposes in the peripheral portion between the transparent insulative substrates.

Moreover, the touch panel of the present invention, which has a light-shielding effect in its peripheral portion, may have dot-shaped spacers formed on the surface of the transparent electrode 12 of the conductive panel 1 located on the touch input side or on the surface of the transparent electrode 22 of the conductive panel 2 located on the screen side. The dot-shaped spacers can be obtained by forming an acrylate resin such as melamine acrylate resin, urethane acrylate resin, epoxy acrylate resin, methacryl acrylate resin, acrylic acrylate resin; a transparent photo-curing type resin of polyvinylalcohol resin or the like into minute dots through a photo process. It is also possible to form numbers of minute dots by a printing method so as to make the dots serve as spacers. It is also possible to obtain the dots by spraying or applying a dispersion liquid of particles constructed of an inorganic substance or an organic substance and then drying the same.

Moreover, the transparent insulative substrates of the conductive panels located on the touch input side and on the screen side may have not only a function as a support of the transparent electrodes but also another optical function or the like. For example, when an antireflection filter of a circular polarization type is provided inside the touch panel, as disclosed in Unexamined Japanese Patent Publication No. 10-48625, the touch panel has a construction such that at least a first quarter wavelength plate, two layers of transparent electrodes opposing via spacers, a second quarter wavelength plate whose optical axis is perpendicular to that of the first quarter wavelength plate, and a polarizing plate are arranged in order from the liquid crystal display panel. Therefore, it is allowed to use the first quarter wavelength plate as the transparent insulative substrate of the conductive panel located on the screen side or use the second quarter wavelength plate as the transparent insulative substrate of the conductive panel located on the touch input side. It is to be noted that the quarter wavelength plate is a transparent resin plate or a transparent film, which has a function to change a linearly polarized light into a circularly polarized or approximately circularly polarized light by giving a phase shift of time (phase difference) to two polarized light components, which are obtained by decomposing a linearly polarized light and orthogonal to each other, as well as a function to delay the phase of one polarized light relative to incident light of a center wavelength (about 550 nm) in the visible light region (about 400 nm to 700 nm) by a quarter wavelength.

The touch panel of the present invention having the light-shielding effect in its peripheral portion, which has the construction as described above, therefore has the excellent effects as follows.

That is, in the analog resistive film system touch panel, where conductive panels are arranged opposite to each other with the transparent electrodes formed by the whole or a part of transparent conductive films and the wiring lines formed on one-side surfaces of the transparent insulative substrates, and one or more resin layers are provided for various purposes in the peripheral portion located between the transparent insulative substrates, at least one layer of the resin layers is colored black so as to serve as a light-shielding layer for shielding light. For example, when the resin layer is constructed of a plurality of layers, the light-shielding function is added by making at least one layer out of the plurality of resin layers serve as a light-shielding layer for shielding light while being colored black. This arrangement does not need the operation of preparing and sticking a black light-shielding sheet for the measures against the luminescent line aside from the touch panel dissimilarly to the prior art. Therefore, the visibility of the screen can be improved at low cost.

Moreover, since the total thickness of the product provided with an LCD with a touch panel, such as a word processor and a personal computer, is reduced due to the needlessness of a black light-shielding sheet, this arrangement can cope with a thickness reduction.

By properly combining arbitrary embodiments out of the aforementioned various embodiments, the effects owned by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An analog resistive film system touch panel comprising:
   conductive panels arranged opposite to each other with transparent electrodes having a light-shielding effect in its peripheral portion being formed by a whole or a part of transparent conductive films and wiring lines formed on one-side surfaces of transparent insulative substrates; and
   a resin layer comprised of one or more layers located peripherally between the transparent insulative substrates of the conductive panels arranged, opposite to each other,
   wherein at least one layer of the resin layers serves as a light-shielding layer for restraining occurrence of a luminescent line in a portion located inside a screen of the conductive panel near an edge or a back-light-use or front-light-use line light source side by shielding light while being colored black.

2. The touch panel having a light-shielding effect in its peripheral portion as claimed in claim 1, wherein the light-shielding layer is an adhesion layer, which is arranged between the conductive panels and colored black so as to shield light.

3. The touch panel having a light-shielding effect in its peripheral portion as claimed in claim 1, wherein the light-shielding layer is at least one layer of wiring line overcoat layers, said at least one layer being arranged on the wiring line located in a peripheral portion of the conductive panel and colored black so as to shield light.

4. The touch panel having a light-shielding effect in its peripheral portion as claimed in claim 1, wherein the light-shielding layer is at least one layer of insulative patterning layers, said at least one layer being arranged on the transparent conductive film located in a peripheral portion of the conductive panel and colored black so as to shield light.

5. The touch panel having a light-shielding effect in its peripheral portion as claimed in claim 3, wherein the light-shielding layer is at least one layer of insulative patterning layers, said at least one layer being arranged on the transparent conductive film located in a peripheral portion of the conductive panel and colored black so as to shield light.

6. The touch panel having a light-shielding effect in its peripheral portion as claimed in claim 2, wherein the light-shielding layer is at least one layer of wiring line overcoat layers, said at least one layer being arranged on the wiring line located in a peripheral portion of the conductive panel and colored black so as to shield light.

7. The touch panel having a light-shielding effect in its peripheral portion as claimed in claim 2, wherein the light-shielding layer is at least one layer of insulative patterning layers, said at least one layer being arranged on the transparent conductive film located in a peripheral portion of the conductive panel and colored black so as to shield light.

* * * * *